US010029608B2

(12) United States Patent
Miller

(10) Patent No.: US 10,029,608 B2
(45) Date of Patent: Jul. 24, 2018

(54) AUTOMATIC VEHICLE LIGHTING CONTROL

(71) Applicant: Ford Global Technologies, LLC, Dearborn, MI (US)

(72) Inventor: Kenneth James Miller, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 5 days.

(21) Appl. No.: 14/845,637

(22) Filed: Sep. 4, 2015

(65) Prior Publication Data

US 2017/0066368 A1 Mar. 9, 2017

(51) Int. Cl.
*B60Q 1/14* (2006.01)
*B60Q 1/08* (2006.01)
*B60Q 1/20* (2006.01)
*B60Q 1/22* (2006.01)
*B60Q 1/24* (2006.01)
*B60Q 1/00* (2006.01)

(52) U.S. Cl.
CPC ......... *B60Q 1/1461* (2013.01); *B60Q 1/0076* (2013.01); *B60Q 1/08* (2013.01); *B60Q 1/1423* (2013.01); *B60Q 1/20* (2013.01); *B60Q 1/22* (2013.01); *B60Q 1/24* (2013.01)

(58) Field of Classification Search
CPC ........ B60Q 1/14; B60Q 1/1423; B60Q 1/143; B60Q 2300/21
USPC .............................. 315/77, 80, 82
See application file for complete search history.

(56) References Cited

U.S. PATENT DOCUMENTS

| 3,500,120 | A | * | 3/1970 | Rudd | B60Q 11/00 15/250.002 |
|---|---|---|---|---|---|
| 5,473,306 | A | | 12/1995 | Adell | |
| 5,773,935 | A | * | 6/1998 | Wagner | B60Q 1/076 307/10.8 |
| 6,711,481 | B1 | * | 3/2004 | King | B60Q 1/14 315/82 |
| 7,449,997 | B2 | | 11/2008 | Furusawa et al. | |
| 7,625,107 | B2 | * | 12/2009 | Brod | B60Q 1/1415 362/464 |

(Continued)

FOREIGN PATENT DOCUMENTS

GB 2448181 A 10/2008
GB 2497646 A 6/2013

*Primary Examiner* — Tung X Le
(74) *Attorney, Agent, or Firm* — Frank A. MacKenzie; Brooks Kushman P.C.

(57) ABSTRACT

A vehicle includes headlights, a headlight switch, and a controller. The headlight switch may have automatic and override positions, and include a biasing member configured to return the switch to the automatic position from the override position. The controller may be configured to, in response to a signal indicative of movement from the automatic position to the override position, illuminate the headlights until the vehicle is in a key-off state, and prior to the signal, illuminate the headlights based on ambient light conditions. Also, the controller may set a threshold based on a level of ambient light sensed at a time of the input indicative of headlight switch movement from the automatic position to the override position and illuminate the headlights until first occurrence of the ambient light exceeding the threshold or the vehicle being in the key-off state.

20 Claims, 3 Drawing Sheets

(56) References Cited

U.S. PATENT DOCUMENTS

| | | | |
|---|---|---|---|
| 7,759,819 B2* | 7/2010 | Michiyama | B60Q 1/1423 200/61.54 |
| 8,710,384 B2* | 4/2014 | Son | B60Q 1/00 200/18 |
| 8,853,946 B2 | 10/2014 | Wolski et al. | |
| 2003/0138131 A1* | 7/2003 | Stam | B60Q 1/085 382/104 |
| 2007/0276551 A1 | 11/2007 | Brod | |
| 2008/0246404 A1* | 10/2008 | Shelton | B60Q 1/1423 315/82 |
| 2013/0294100 A1 | 11/2013 | Ishizaki | |
| 2014/0029277 A1* | 1/2014 | Hartmann | B60Q 1/0076 362/465 |
| 2014/0183944 A1 | 7/2014 | Kim et al. | |
| 2015/0035435 A1 | 2/2015 | Alberti et al. | |
| 2015/0217678 A1 | 8/2015 | Longueville et al. | |

* cited by examiner

AUTOMATIC VEHICLE LIGHTING CONTROL

TECHNICAL FIELD

This disclosure relates to operation of vehicle lights that include a switch mechanism biased to automatically return the switch to an automatic control mode after manually overriding the automatic control mode.

BACKGROUND

Lighting systems for vehicles include exterior lights, interior lights, a light switch, and a controller. Exterior lights include headlights, tail lights, and running lights and interior lights include dome lights, ambient lights, and door lights. The light switch typically provides a signal to a controller such as a Body Control Module (BCM). The BCM may include drivers such as intelligent metal oxide semiconductor field effect transistors (MOSFETs) to supply power to the lights. Upon power supplied to the lights, the lights will illuminate at a specific color determined by vehicle designers based on the location and function of the lights.

The comfort and convenience associated with the operation of vehicular systems may make a lasting impression that can either strongly encourage or discourage a customer from purchasing a vehicle. As a result, vehicle designers, in certain circumstances, are designing systems based on studies of human factors and ergonomics (HF&E).

Current light switches are configured with static positions such as lights off, parking lights activated, and headlights activated. Some vehicles also include an automatic light control mode that uses vehicle sensors such as an ambient light detector to automatically turn on and turn off the lights of the vehicle. With the current switches, a driver of the vehicle must manually select the choice of operation by manually rotating, pulling, or sliding the switch into the desired static position.

Advances over the above approaches for switching a lighting system are summarized below.

SUMMARY

A lighting system for a vehicle includes headlights and a controller. The controller is configured to, in response to input indicative of headlight control interface movement from an automatic position to an override position and back to the automatic position, illuminate the headlights until the vehicle is in a key-off state, and prior to the input, illuminate the headlights based on ambient light conditions.

A vehicle includes headlights, a headlight switch, and a controller. The headlight switch may have automatic and override positions, and include a biasing member configured to return the switch to the automatic position from the override position. The controller may be configured to, in response to a signal indicative of movement from the automatic position to the override position, illuminate the headlights until the vehicle is in a key-off state, and prior to the signal, illuminate the headlights based on ambient light conditions.

A vehicle includes headlights and a controller. The controller may be configured to, in response to input indicative of headlight control interface movement from an automatic position to an override position and back to the automatic position, set a threshold based on ambient light incident upon the vehicle at a time of the movement, and illuminate the headlights until first occurrence of the ambient light exceeding the threshold or the vehicle being in a key-off state.

DETAILED DESCRIPTION

Figure 1A:
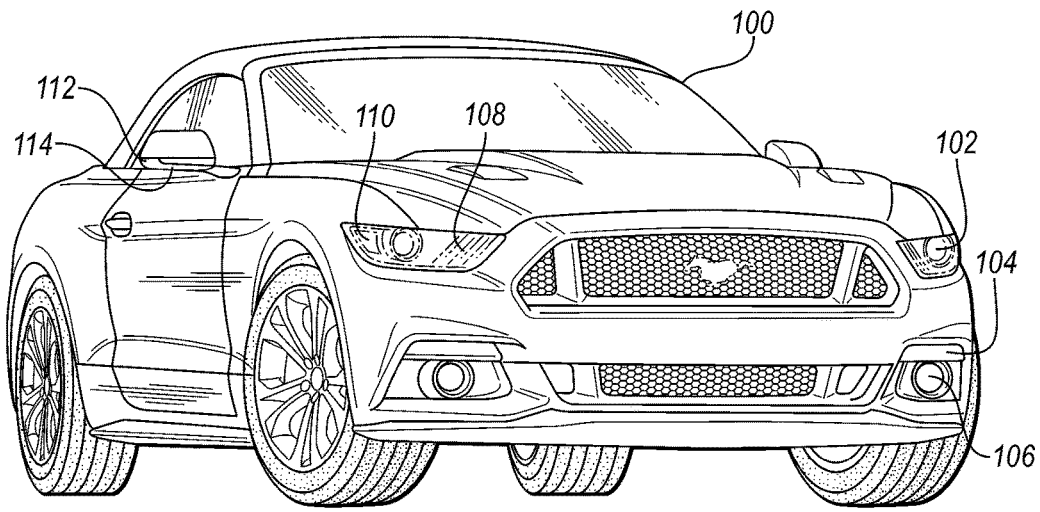
FIG. 1A is a right/front perspective view of a vehicle including exterior lights.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that the term lamp and light bulb may be implemented using an incandescent light bulb, a halogen light, a Light Emitting Diode (LED), a compact fluorescent light (CFL) bulb, a High-intensity discharge lamps (HID lamps), or any light source acceptable for use as a lamp on vehicle by the World Forum for Harmonization of Vehicle Regulations (ECE Regulations) or the Federal Motor Vehicle Safety Standards (FMVSS). It is also recognized that the term filament may be implemented using an illumination structure for the corresponding lamp. For example, a P-N junction in an LED corresponds to a filament in an incandescent bulb. It is further recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

The comfort and convenience associated with operation of a vehicle and the vehicle's interior may make a lasting impression that can either strongly encourage or discourage a customer from purchasing the vehicle. An aspect of comfort and convenience is automatic operation of vehicular systems and the ability to easily override the automatic operation. Along with the ability to easily override the system is the ability of the system to return to automatic operation without driver intervention. The ability to return to automatic operation is an important feature because the majority of drivers that have automatic light control use the automatic light control. And when they override the automatic light control by using a static lights-on mode, they often forget that they changed the position of the switch and unwanted operation may result. One aspect of unwanted operation is the possibility of the lights remaining on thereby discharging the battery of the vehicle and impeding the ability to start the vehicle.

The automatic headlight feature is a desired feature that has been adopted by many vehicle drivers in so much as some customers will always keep the headlight dial in the automatic position, instead of using a manual on or off position. One issue is that on dreary, rainy, grey, or foggy days when visibility of other cars is poor, the automatic headlights may not activate, and the driver may not move the dial to the on position out of fear that they may accidentally forget to turn the dial back to automatic headlight position at the end of the trip. Here is a solution that allows the driver to override the automatic setting such that the vehicle lights including headlights are activated to illuminate the roadway while a bias such as a spring automatically returns the dial to the automatic headlight mode.

A typical automatic headlight system includes a headlight control module that may be a headlight switch such as a rotary switch, a linear switch, a push/pull switch, or a graphic user interface (GUI) of an infotainment system, driver information console, or other display system. Typically, the headlight control module includes an off position, an on position, and an automatic position. The off, on, and automatic positions typically remain in the last position set at. For example, once a driver manually switches the headlight switch to the automatic position, the headlight switch will remain in that position until the switch is manually changed to another position. With the override position, when the driver manually changes position of the switch to override, the switch will automatically return to the automatic mode. For example, a rotary headlight switch may have the override position next to the automatic mode position such that a driver may perform a "twist-to-the-right" of a dial of the switch to activate the override mode, then upon release of the dial of the switch, a spring returns the dial of the switch to the automatic position. A controller, such as a processor or logic circuit may be configured to provide a control system that detects the "twist-to-the-right" of the switch, and upon detection of the transition from the automatic position to the override position and back to the automatic position, the controller may turn the lights of the vehicle on until end of the trip, or until the detected lighting conditions have improved significantly since the 'detected twist'.

Here is an example of the steps to the system when the override position is to the right of the automatic position:
1. Operator twists dial to the right beyond the automatic position
2. When operator releases the dial, the dial returns to automatic position
3. A controller detects the "twist-to-the-right"
4. The controller signals to turn headlights on in response to the detected movement
5. The controller signals to maintain illumination of the headlights until Key-off, or
6. If configured to sense ambient light, the controller signals to maintain illumination of the headlights until the ambient light exceeds a threshold:
    a. Here, the controller will set an ambient light threshold when the "twist" is detected
    b. When the ambient light level exceeds the threshold, the controller may either:
        i. Turn light off, or
        ii. Signal the driver via a display or audio message that lights are still on The ambient light may be detected by a light sensor or camera coupled to the vehicle and configured to measure light that is incident to a surface of the vehicle. The angle of incidence is not critical, as is well known in the art, however it is important to determine that the measured light is actually ambient light and not a temporary light condition based on headlights of other vehicles proximate to the vehicle or other artificial light conditions.

FIG. 1A is a right/front perspective view of a vehicle 100 including exterior lights. Lighting of a motor vehicle is regulated by the Federal Motor Vehicle Safety Standard 108 (FMVSS 108) administered by the United States Department of Transportation's (DOT) National Highway Traffic Safety Administration (NHTSA). Exterior lights include a headlight 102 that may have a high-beam setting and a low-beam setting. The low-beam setting typically limits an intensity and height of the light beam from the headlight, while the high-beam setting typically has an illumination pattern greater than the illumination pattern of the low beam setting. Another exterior light is a front turn signal 104. Vehicles typically have a left front turn signal and a right front turn signal. Some vehicles have fog lights 106 also referred to as driving lights. Vehicle 100 also includes front running lights 108; however, some vehicles may utilize turn signals in place of running lights 108 by using a single multi-filament bulb or multiple single filament bulbs in the front turn signals. Front cornering lights 110 are usually illuminated while the running lights 108 are illuminated. A mirror light 112 may be illuminated along with the running lights 108. The mirror light 112 may have a single bulb having a dual filament arrangement or may have multiple single filament bulbs such that an intensity of the mirror light 112 flashes when the turn signals are activated. In some implementations, a vehicle may also have a quarter panel light located between the front wheels well and the hinge plane of the front door. The quarter panel light may be illuminated along with the running lights 108 and similar to the mirror light 112 may have a dual filament arrangement such that the intensity increases and decreases when the turn signals are activated. The vehicle 100 may also have a puddle light 114 that is typically white and configured to illuminate an area of the ground to the side of the vehicle 100. The puddle lamps 114 may be activated when the vehicle is stationary to illuminate a side of the vehicle 100 such as when the vehicle is parked and people are entering the vehicle 100 and exiting the vehicle 100.

Figure 1B:
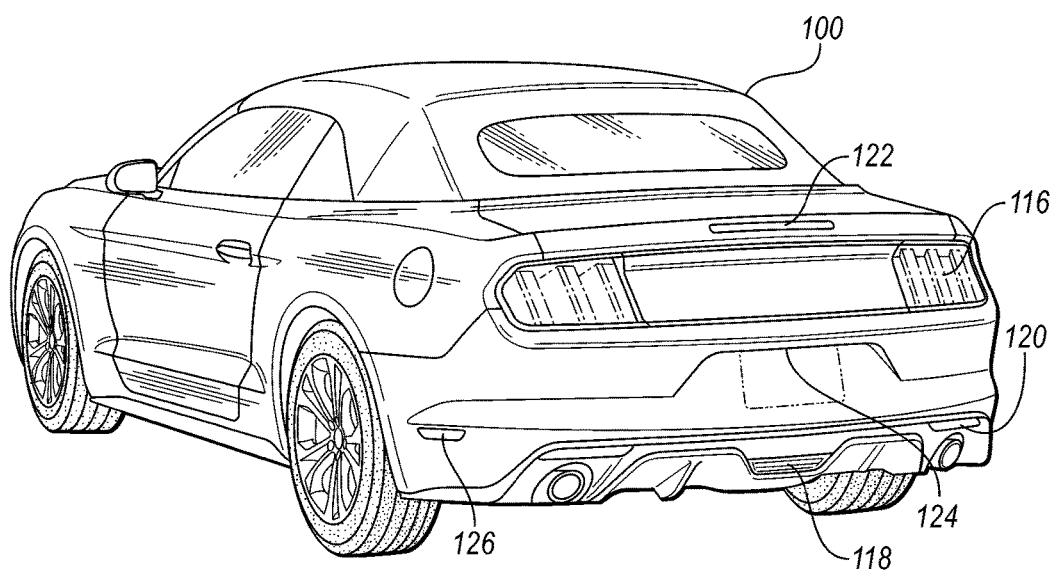
FIG. 1B is a left/rear perspective view of the vehicle shown in FIG. 1 including exterior lights.

FIG. 1B is a left/rear perspective view of the vehicle 100 shown in FIG. 1 including exterior lights. The rear of the vehicle 100 has tail lights 116 also referred to as rear lights or back lights, such as a right and a left tail light that may be light together indicative of application of a brake of the vehicle, flashing together indicative of a hazard signal, or flashing independently indicative of activation of a turn signal. In some implementations, the tail lights 116 may be activated at a given intensity, i.e. a low intensity, with activation of running lights, and activate at an increased intensity, i.e. high intensity, according to activation of brakes, turn signals, or hazard switch. A back-up light 118 is typically activated when a transmission mode to reverse the vehicle is selected. The back-up light is typically white and is designed to illuminate an area proximate to the rear of the vehicle 100. The back-up lights are typically brighter than other rear facing lights, and may be activated when the vehicle 100 is stationary or parked to illuminate the area proximate to the rear of the vehicle 100. The vehicle may have dedicated rear running light 120; however, some vehicles may utilize the rear turn signals in place of rear running lights 120 by using a single multi-filament bulb or multiple single filament bulbs in the rear turn signal. A rear license plate light 124 usually illuminates an area around the license plate with a white light. Rear cornering lights 126 are usually illuminated while the running lights 120 are illuminated.

Figure 2:
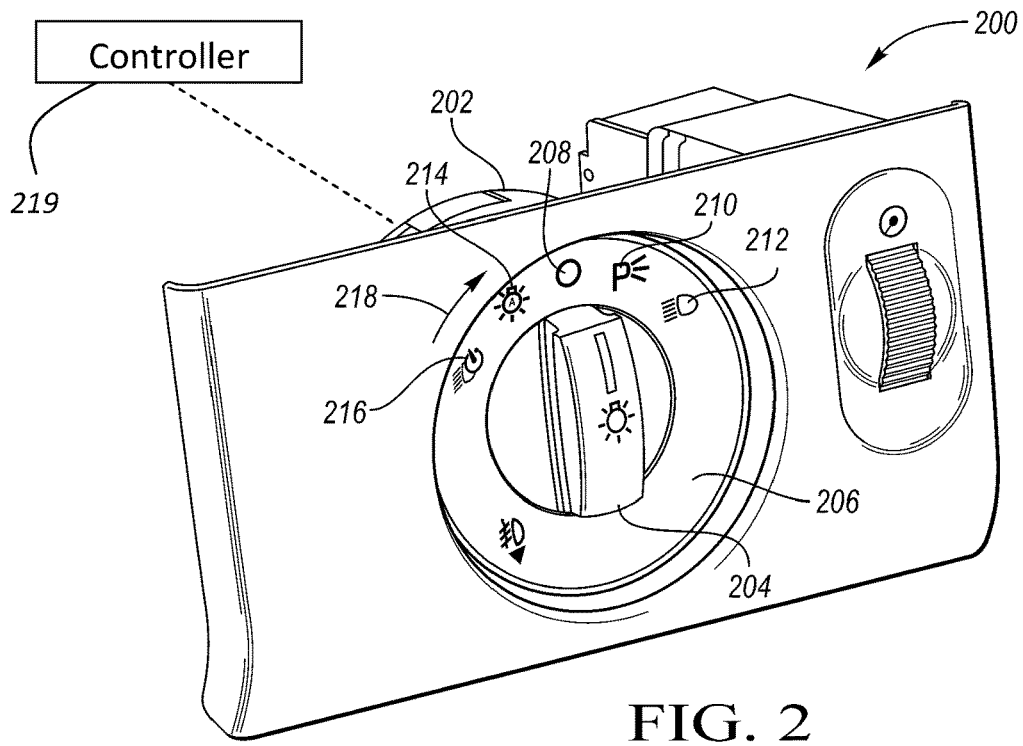
FIG. 2 is an exemplary headlight switch mechanism including an automatic position and an override position.

FIG. 2 is an exemplary headlight switch mechanism including an automatic position and an override position. The switch assembly 200 is one embodiment of a headlight control interface, another embodiment includes a graphical user interface (GUI) of a driver information console (DIC), infotainment system, or vehicle control panel. The GUI may include a touch screen coupled with a display screen or buttons coupled with a display screen. In FIGS. 2-5, the headlight control interface is a switch. The switch assembly 200 has a switch mechanism 202. The switch mechanism 202 is shown as a rotary switch; however, the concepts of this switch assembly 200 may be adapted to a linear switch, a push/pull-switch, or a toggle switch. A rotary switch is commonly used as a lighting control switch in most vehicles and is used in this exemplary illustration. The rotary switch typically has at least one electrical contact that is composed of two pieces of an electrically conductive material capable of passing an electrical current or insulating from the flow of an electric current when the gap between the conductive materials are closed or open. The switch mechanism 202 may be configured such that conductive material is coupled to a shaft of the switch mechanism 202 and other conductive material is positioned in a housing of the switch mechanism 202. The shaft is typically coupled to a knob 204, wherein the knob 204 may have an indicator. The switch 200 also includes a dial 206 also referred to as a face of the switch. The knob 204 is coupled to the shaft and configured to rotate such that the indictor of the knob 204 aligns with icons on the dial 206 to indicate a position of the switch contacts. The rotation and selection of the knob 204 to a position of the switch typically aligns a specific contact from a plurality of available contacts. One of the positions may be indicative of no contact or an open circuit.

The switch plate 206 may be marked to indicate a desired selection or position of the contacts. The switch plate 206 may include a position indicative of a connection to provide a signal to shut off the lights of the vehicle (OFF 208). The switch plate 206 may include a position indicative of a connection to provide a signal to turn on parking lights of the vehicle (PARKING 210). The switch plate 206 may include a position indicative of a connection to provide a signal to turn on the lights of the vehicle (ON 212). The switch plate 206 may include a position indicative of a connection to provide a signal to turn on the lights of the vehicle automatically such as based on ambient light, a timer, or activation of windshield wipers (AUTOMATIC or AUTO 214). Typically, the switch 200 is configured such that the positions OFF 208, PARKING 210, ON 212, and AUTO 214 are stationary positions in that once the knob 204 is rotated to selected position, the switch will remain in that position until a force is applied to rotate the knob 204 to a different position. A new position is disclosed in which the switch plate 206 includes a position indicative of a connection to provide a signal to override the automatic position (OVERRIDE 216). When a force is applied to rotate the knob 204 to the OVERRIDE 216 position, a bias such as a spring in the switch will apply a force 218 to rotate the knob back to the AUTO 214 position.

Figure 3:
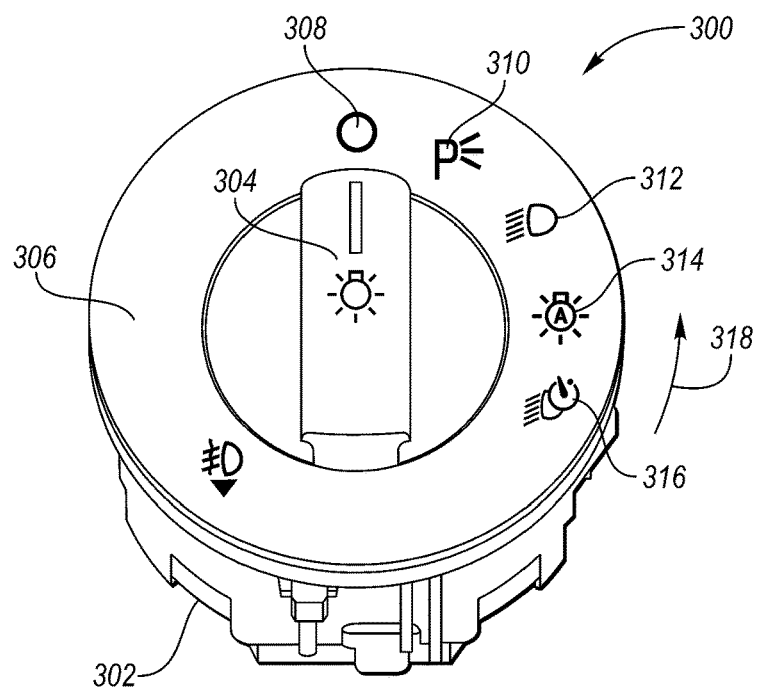
FIG. 3 is an exemplary headlight switch mechanism including an automatic position and an override position.

FIG. 3 is an exemplary headlight switch mechanism including an automatic position and an override position. The switch assembly 300 has a switch mechanism 302. The switch mechanism 302 is shown as a rotary switch; however, the concepts of this switch assembly 300 may be adapted to a linear switch, a push/pull-switch, or a toggle switch. The switch assembly 302 includes a knob 304 configured to rotate and select contacts of the switch. The knob 304 includes an indicator that is aligned with icons on a face plate 306 to indicate which contacts are selected. The switch plate 306 may include a position indicative of a connection to provide a signal to shut off the lights of the vehicle (OFF 308). The switch plate 306 may include a position indicative of a connection to provide a signal to turn on parking lights of the vehicle (PARKING 310). The switch plate 306 may include a position indicative of a connection to provide a signal to turn on the lights of the vehicle (ON 312). The switch plate 306 may include a position indicative of a connection to provide a signal to turn on the lights of the vehicle automatically such as based on ambient light, a timer, or activation of windshield wipers (AUTOMATIC or AUTO 314). Typically, the switch 300 is configured such that the positions OFF 308, PARKING 310, ON 312, and AUTO 314 are stationary positions in that once the knob 304 is rotated to selected position, the switch will remain in that position until a force is applied to rotate the knob 304 to a different position. A new position is disclosed in which the switch plate 306 includes a position indicative of a connection to provide a signal to override the automatic position (OVERRIDE 316). When a force is applied to rotate the knob 304 to the OVERRIDE 316 position, a bias such as a spring in the switch will apply a force 318 to rotate the knob back to the AUTO 314 position.

OVERRIDE 216 and OVERRIDE 316 collectively referred to as the override position may turn on the headlights to illuminate the headlights until the vehicle is in a key-off state. Prior to entering the override mode, the headlights may have been controlled in an automatic mode. The automatic mode typically controls the illumination of the headlights based on ambient light. For example, if the ambient light proximate to the vehicle, such as detected by a light sensor in the vehicle, is below a threshold, the lights will turn on, and if the ambient light is above the threshold, the lights will turn off. Here, the use of hysteresis removes toggling of the lights due to fluctuations in ambient light (e.g., light passing through trees along the roadway). The hysteresis may include the use of a timer and the use of distinct turn-on levels and turn-off levels with a range of levels in between the turn-on and turn-off levels. However, as many people have different light sensitivity, a driver may wish to adjust the threshold due to low ambient light conditions such as dusk, dawn, overcast, foggy, rainy, or traveling in a tunnel in which the driver may desire increased visibility. Here the override position may be configured to set an ambient light threshold at which the lights transition from off to on, and from on to off. Upon rotating the knob to select the override position, the ambient light threshold would be set at either the current ambient light proximate to the vehicle, or at a level a predetermined amount less than the current ambient light proximate to the vehicle. This ambient light setting would be retained until the vehicle is in a key-off state. A key-off state includes when an ignition key is turned off such as when a physical key is turned off or turned off and removed from the ignition, or when the power button in a keyless entry system is turned off. The key-off state may also be a predetermined time after the physical key is turned off or the power button is turned off.

Another embodiment of the override position is to turn on the headlights until the vehicle is in a key-off condition. An alternative embodiment is if the vehicle is in a key-off condition, in which rotation of the knob to the override position causes a processor or controller (219) to illuminate lights proximate to the vehicle, such as puddle lights, back-up lights, and headlights. The override positions may also be deactivated if the knob (204, 304) is rotated to the OFF (208, 308) position. Yet another embodiment includes the vehicle being in an accessory-on state, such as powering up the infotainment system. Here, the rotation of the knob to the override position causes a processor or controller to illuminate lights proximate to the vehicle, such as puddle lights, back-up lights, and headlights.

Figure 4:
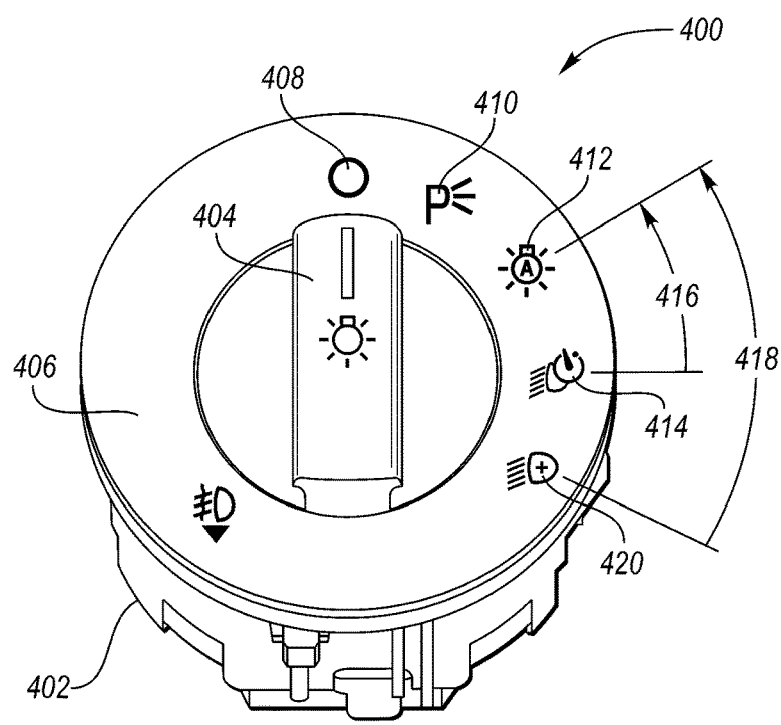
FIG. 4 is an exemplary headlight switch mechanism including an automatic position and multiple override positions.

FIG. 4 is an exemplary headlight switch mechanism including an automatic position and multiple override positions. The switch assembly 400 has a switch mechanism 402. The switch mechanism 402 is shown as a rotary switch; however, the concepts of this switch assembly 400 may be adapted to a linear switch, a push/pull-switch, or a toggle switch. The switch assembly 402 includes a knob 404 configured to rotate and select contacts of the switch. The knob 404 includes an indicator that is aligned with icons on a face plate 406 to indicate which contacts are selected. The switch plate 406 may include a position indicative of a connection to provide a signal to shut off the lights of the vehicle (OFF 408). The switch plate 406 may include a position indicative of a connection to provide a signal to turn on parking lights of the vehicle (PARKING 410). The switch plate 406 may include a position indicative of a connection to provide a signal to turn on the lights of the vehicle automatically such as based on ambient light, a timer, or activation of windshield wipers (AUTOMATIC or AUTO 412). Typically, the switch 400 is configured such that the positions OFF 408, PARKING 410, and AUTO 412 are stationary positions in that once the knob 404 is rotated to the selected position, the switch will remain in that position until a force is applied to rotate the knob 404 to a different position.

In this embodiment, two new positions are disclosed in which the switch plate 406 includes a first position indicative of a connection to provide a signal to override the automatic position (OVERRIDE_1 414). When a force is applied to rotate the knob 404 to the OVERRIDE_1 414 position, a bias such as a spring in the switch will apply a force 416 to rotate the knob back to the AUTO 412 position. A second position (OVERRIDE_2 420) is indicative of a connection to provide a signal to override the first override position (OVERRIDE_1 414). When a force is applied to rotate the knob 404 to the OVERRIDE_2 420 position, a bias such as a spring in the switch will apply a force 418 to rotate the knob back to the AUTO 412 position. Here, the bias may be configured to such that a force to move the knob 404 from AUTO 412 to OVERRIDE_1 414 is less than the force required moving the knob 404 from OVERRIDE_1 414 to OVERRIDE_2 420. Here, the OVERRIDE_1 position may be used to set the ambient light threshold until the vehicle is in a key-off state and the OVERRIDE_2 position may be used to illuminate the headlights until the vehicle is in a key-off state. The override positions (OVERRIDE_1 414, OVERRIDE_2 420) may be deactivated if the knob 404 is rotated to the OFF 408 position.

Figure 5:
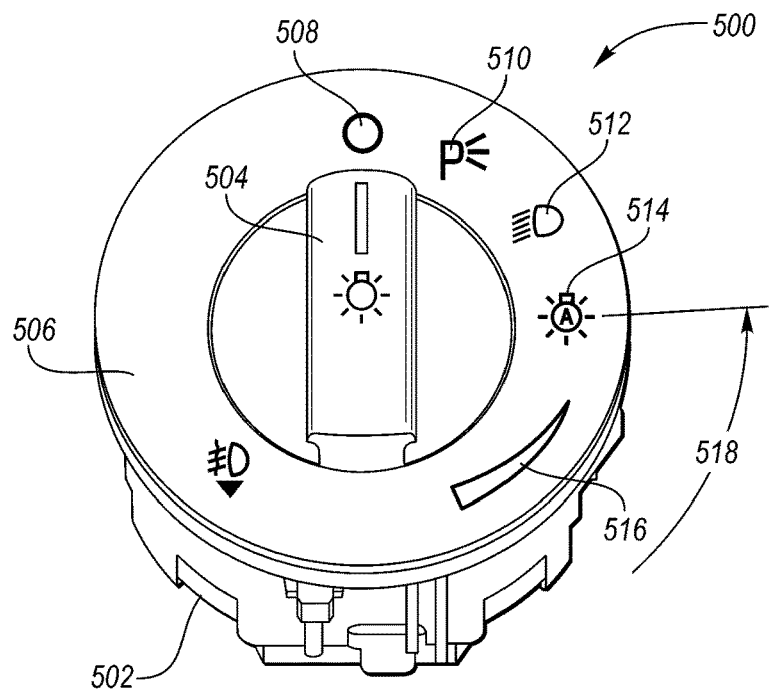
FIG. 5 is an exemplary headlight switch mechanism including an automatic position and an override position, wherein the override position includes a gradient associated with an angle of motion.

FIG. 5 is an exemplary headlight switch mechanism including an automatic position and an override position wherein the override position includes a gradient associated with an angle of motion. The switch assembly 500 has a switch mechanism 502. The switch mechanism 502 is shown as a rotary switch; however, the concepts of this switch assembly 500 may be adapted to a linear switch, a push/pull-switch, or a toggle switch. The switch assembly 502 includes a knob 504 configured to rotate and select contacts of the switch. The knob 504 includes an indicator that is aligned with icons on a face plate 506 to indicate which contacts are selected. The switch plate 506 may include a position indicative of a connection to provide a signal to shut off the lights of the vehicle (OFF 508). The switch plate 506 may include a position indicative of a connection to provide a signal to turn on parking lights of the vehicle (PARKING 510). The switch plate 506 may include a position indicative of a connection to provide a signal to turn on the lights of the vehicle (ON 512). The switch plate 506 may include a position indicative of a connection to provide a signal to turn on the lights of the vehicle automatically such as based on ambient light, a timer, or activation of windshield wipers (AUTOMATIC or AUTO 514). Typically, the switch 500 is configured such that the positions OFF 508, PARKING 510, ON 512, and AUTO 514 are stationary positions in that once the knob 504 is rotated to the selected position, the switch will remain in that position until a force is applied to rotate the knob 504 to a different position.

In this embodiment, a new position is disclosed in which the switch plate 506 includes a range of intermediate positions indicative of a connection to provide a signal to override the automatic position (OVERRIDE 516). Here, the signal may be indicative of a degree of rotation within the range of positions of OVERRIDE 516. When a force is applied to rotate the knob 504 to the OVERRIDE 516 position, a bias such as a spring in the switch will apply a force 518 to rotate the knob back to the AUTO 514 position. The bias may be configured such that the force increases as the angle of rotation from the AUTO 514 position increases. Based on the signal indicative of the degree of rotation, a controller may adjust a level of illumination of the headlights of the vehicle, or may set a level of illumination of interior lights of the vehicle until the vehicle is in a key-off state.

Control of the headlights in many modern vehicles is performed by controller or module such as a Body Control Module (BCM). The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A lighting system for a vehicle comprising:
   headlights; and
   a controller configured to,
   in response to input indicative of headlight control interface movement from an automatic position to an override position and back to the automatic position, illuminate the headlights until the vehicle is in a key-off state regardless of ambient light conditions, and
   prior to the input, illuminate the headlights based on the ambient light conditions.

2. The system of claim 1 further comprising a headlight control interface configured to return to the automatic position from the override position in an absence of user input.

3. The system of claim 2, wherein the override position of the headlight control interface includes at least a first override position and a second override position, and wherein the controller is further configured to,
   in response to input indicative of headlight control interface movement from the automatic position to the first override position, set a threshold based on a level of ambient light sensed at a time of the input indicative of headlight control interface movement from the automatic position to the first override position and illuminate the headlights until first occurrence of the ambient light exceeding the threshold or the vehicle being in the key-off state, and
   in response to input indicative of headlight control interface movement from the first override position to the second override position and back to the first override position, illuminate the headlights until the vehicle is in the key-off state.

4. The system of claim 2, wherein the controller is further configured to, in response to input indicative of headlight control interface movement from the automatic position to the override position, set a threshold based on a level of ambient light sensed at a time of the movement and illuminate the headlights until first occurrence of the ambient light exceeding the threshold or the vehicle being in the key-off state.

5. The system of claim 4, wherein the headlight control interface is a rotary switch, and the controller is further configured to increase hysteresis associated with the threshold based on an increase in a degree of rotation of the rotary switch within the override position, and to illuminate the headlights until first occurrence of the ambient light exceeding the threshold by the hysteresis or the vehicle being in the key-off state.

6. The system of claim 2, wherein headlight control interface is a rotary switch.

7. The system of claim 6, wherein the override position of the headlight control interface includes a range of intermediate positions within the override position.

8. The system of claim 7, wherein the controller is further configured to increase a level of illumination of the headlights based on an increase in a degree of rotation of the rotary switch within the override position, and to maintain the level of illumination until the vehicle is in the key-off state.

9. The system of claim 6 further including back-up lights and puddle lights, wherein the controller is further configured to, in response to input indicative of headlight control interface movement from the automatic position to the override position and back to the automatic position while the vehicle is in an accessory-on state, illuminate the back-up lights and puddle lights until a predetermined time after the vehicle is in the key-off state.

10. The system of claim 2 further including fog lights, wherein the override position of the headlight control interface includes at least a first override position and a second override position, and wherein the controller is further configured to,
    in response to input indicative of headlight control interface movement from the automatic position to the first override position and back to the automatic position, illuminate the headlights until the vehicle is in the key-off state, and
    in response to input indicative of headlight control interface movement from the first override position to the second override position and back to the first override position, illuminate the fog lights until the vehicle is in the key-off state.

11. A vehicle comprising:
    headlights;
    a headlight switch having automatic and override positions, and including a biasing member configured to return the switch to the automatic position from the override position; and
    a controller configured to, in response to a signal indicative of movement from the automatic position to the override position, illuminate the headlights until the vehicle is in a key-off state, and prior to the signal, illuminate the headlights based on ambient light conditions.

12. The vehicle of claim 11, wherein the headlight switch is a rotary switch.

13. The vehicle of claim 12 further including interior lights, wherein the controller is further configured to increase an intensity of the interior lights based on an increase in a degree of rotation of the rotary switch within the override position.

14. The vehicle of claim 11 further including fog lights, wherein the controller is further configured to, in response to input indicative of headlight control interface movement from the override position to a 2nd override position and back to the override position, illuminate the fog lights until the vehicle is in the key-off state.

15. A vehicle comprising:
headlights; and
a controller configured to, in response to input indicative of headlight control interface movement from an automatic position to an override position and back to the automatic position, set a threshold based on ambient light incident upon the vehicle at a time of the movement, and illuminate the headlights until first occurrence of the ambient light exceeding the threshold or the vehicle being in a key-off state.

16. The vehicle of claim 15 further comprising a headlight control interface configured to return to the automatic position from the override position in an absence of user input, wherein the headlight control interface is a rotary switch and the override position of the headlight control interface includes a range of intermediate positions within the override position.

17. The vehicle of claim 16, wherein the controller is further configured to increase hysteresis associated with the threshold based on an increase in a degree of rotation of the rotary switch within the override position, and to illuminate the headlights until first occurrence of the ambient light exceeding the threshold by the hysteresis or the vehicle being in the key-off state.

18. The vehicle of claim 16 further including interior lights, wherein the controller is further configured to, while the vehicle is in an accessory-on state, illuminate the interior lights and set a level of illumination of the interior lights based on a degree of rotation of the rotary switch within the override position until a predetermined time after the vehicle is in the key-off state.

19. The vehicle of claim 15, wherein the override position of the headlight control interface includes at least a first override position and a second override position.

20. The vehicle of claim 19 further including fog lights, wherein the controller is further programmed to,
in response to input indicative of headlight control interface movement from the automatic position to the first override position, illuminate the headlights illuminate until first occurrence of the ambient light exceeding the threshold or the vehicle being in a key-off state, and
in response to input indicative of headlight control interface movement from the first override position to the second override position and back to the first override position, illuminate the fog lights until first occurrence of the ambient light exceeding the threshold or the vehicle being in the key-off state.

* * * * *